United States Patent
Khvostichenko et al.

(10) Patent No.: US 10,439,969 B2
(45) Date of Patent: Oct. 8, 2019

(54) DOUBLE FILTERING OF ANNOTATIONS IN EMAILS

(71) Applicant: Google Inc., Mountain View, CA (US)

(72) Inventors: Boris Khvostichenko, Gattikon (CH); Karol Piotr Stosiek, Zurich (CH)

(73) Assignee: Google LLC, Mountain View, CA (US)

( * ) Notice: Subject to any disclaimer, the term of this patent is extended or adjusted under 35 U.S.C. 154(b) by 589 days.

(21) Appl. No.: 13/742,945

(22) Filed: Jan. 16, 2013

(65) Prior Publication Data

US 2015/0200875 A1     Jul. 16, 2015

(51) Int. Cl.
*H04L 12/58*     (2006.01)

(52) U.S. Cl.
CPC .................... *H04L 51/12* (2013.01)

(58) Field of Classification Search
CPC ..... H04L 12/581; H04L 12/585; H04L 12/58; G06Q 10/107
USPC ................. 709/203–207, 217, 229
See application file for complete search history.

(56) References Cited

U.S. PATENT DOCUMENTS

| | | | | |
|---|---|---|---|---|
| 6,421,709 | B1 * | 7/2002 | McCormick | G06Q 10/107 709/206 |
| 6,941,466 | B2 * | 9/2005 | Mastrianni | 726/22 |
| 7,257,774 | B2 * | 8/2007 | Denoue | G06F 17/30017 707/E17.009 |
| 8,706,685 | B1 * | 4/2014 | Smith et al. | 707/608 |
| 9,015,130 | B1 * | 4/2015 | Michaelis | G06F 13/14 707/689 |
| 2005/0120019 | A1 * | 6/2005 | Rigoutsos | H04L 51/12 |
| 2007/0050444 | A1 * | 3/2007 | Costea et al. | 709/202 |
| 2007/0168430 | A1 * | 7/2007 | Brun et al. | 709/206 |
| 2007/0180060 | A1 * | 8/2007 | Patel | G06Q 10/107 709/219 |
| 2007/0239831 | A1 * | 10/2007 | Basu | 709/206 |
| 2008/0005064 | A1 * | 1/2008 | Sarukkai | G06F 17/241 |
| 2009/0292690 | A1 * | 11/2009 | Culbert | G06Q 10/107 |
| 2010/0037149 | A1 * | 2/2010 | Heath | 715/753 |
| 2010/0100815 | A1 * | 4/2010 | Hutchinson et al. | 715/256 |

(Continued)

FOREIGN PATENT DOCUMENTS

WO     WO 2004075466 A2 *    9/2004     ....... G06F 17/30864

OTHER PUBLICATIONS

Fraternali, Piero, Alessandro Bozzon, Marco Brambilla, Vincenzo Croce, Kathrine Hammervold, Eric Moore, Francesco Saverio Nucci, and Michel Plu. "Model-driven development of personalized, multichannel interfaces for audiovisual search: the PHAROS approach." NEM Summit, Saint Malo, France (2009).*

*Primary Examiner* — Suraj M Joshi
*Assistant Examiner* — Melaku Y Habtemariam
(74) *Attorney, Agent, or Firm* — Shumaker & Sieffert, P.A.

(57) ABSTRACT

A system and method for filtering email annotations is disclosed. An email may be parsed for actionable items and email text associated with those items may be annotated. A server-side filter may be applied to the actionable items to remove annotations that have a low-probability for user action. The email and its associated annotations are then stored on the server. An email client may retrieve the email and its associated annotations from the server and perform render-time filtering. This render-time filtering applies real-time checking for annotations which have a low-probability for user action. The email and its associated annotations are then displayed via a user interface.

12 Claims, 7 Drawing Sheets

(56) References Cited

U.S. PATENT DOCUMENTS

| | | | | |
|---|---|---|---|---|
| 2011/0185024 A1* | 7/2011 | Ramarao | ............... | G06Q 10/107 709/206 |
| 2012/0173633 A1* | 7/2012 | Balabhadrapatruni | ..................... | G06Q 10/107 709/206 |
| 2013/0014026 A1* | 1/2013 | Beringer | .......... | G06Q 10/06311 715/753 |

\* cited by examiner

DOUBLE FILTERING OF ANNOTATIONS IN EMAILS

BACKGROUND

Electronic mail, or email, sometimes contains text that either explicitly or implicitly suggests that a recipient of the email should take some action. For example, an email body may contain text that is a uniform resource locator (URL). By explicitly including a URL in the email body, the email's sender intends for the person receiving the email to click on the URL and view the content which the URL references.

An email may alternatively or additionally contain text which implies that a recipient of the email should take action. For example, if an email sender includes the words, "let's meet tomorrow," the sender may want to schedule a meeting for the day after the email is sent. The email receiver may want to create a calendar event on his or her calendar as a reminder about the meeting based on the email's text.

In order to help a person recognize actions that may be taken based on email text, actionable items in email text can be annotated using hyperlinks, highlighting, underlining, or some other identification that distinguishes text representing actionable items from text that is non-actionable. However, sometimes email text is annotated for actionable items which are unlikely to be acted upon by a user. For example, a user is unlikely to click on an annotation that creates a calendar event when the annotation is on a date that is already in the past.

Users should only be presented with annotations for actionable items that they are likely to act upon. Although some email systems contain email text that is annotated for user action, no systems exist that filter annotations to ensure that annotations displayed to a user have a high probability of user action. There should be a way for email systems to filter annotations so that annotations with a low probability of user action are not stored or shown.

SUMMARY

This specification describes technologies relating to annotating emails based on date and time actionable items in general, and specifically to methods and systems for filtering annotations on actionable items within emails.

In general, one aspect of the subject matter described in this specification can be embodied in a system and method for filtering annotations in email. An exemplary system includes: one or more processing devices and one or more storage devices storing instructions that, when executed by the one or more processing devices, cause the one or more processing devices to retrieve email and associated annotations which identify possible actionable items in the email. The instructions then use client-side filtering rules to determine the email text that should be annotated and display the email along with the determined associated annotations. An exemplary method for client-side filtering annotations in email includes retrieving email and associated annotations which identify possible actionable items in the email. The method then uses client-side filtering rules to determine the email text that should be annotated and displays the email along with the determined associated annotations. A second exemplary method for filtering annotations in email includes: receiving an email on a server; parsing the email to identify possible actionable items; applying server-side filtering rules to the actionable items; annotating email text associated with actionable items to distinguish actionable items from other email text; storing the email and associated annotations; retrieving the email and associated annotations from the server via a client; applying client-side filtering rules to the associated annotations; determining the annotations to display based on the client-side filtering rules; and displaying the email and determined associated annotations.

These and other embodiments can optionally include one or more of the following features: filtering may include: merging, deleting, and removing duplicate annotations; annotating email text may be accomplished by visually distinguishing email text associated with actionable items from other email text; and applying client-side filtering rules to the annotations may include removing annotations that have a low probability of user action. Low probability of user action may be determined by extracting a date from the associated annotations which could be a possible actionable item; comparing the extracted date to the current date; and responsive to the extracted date being in the past, determining that the extracted past date will probably not be acted upon by a user. Low probability of user action can also be determined when an annotation is a date in the past or the annotation is associated with spam email.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 1:
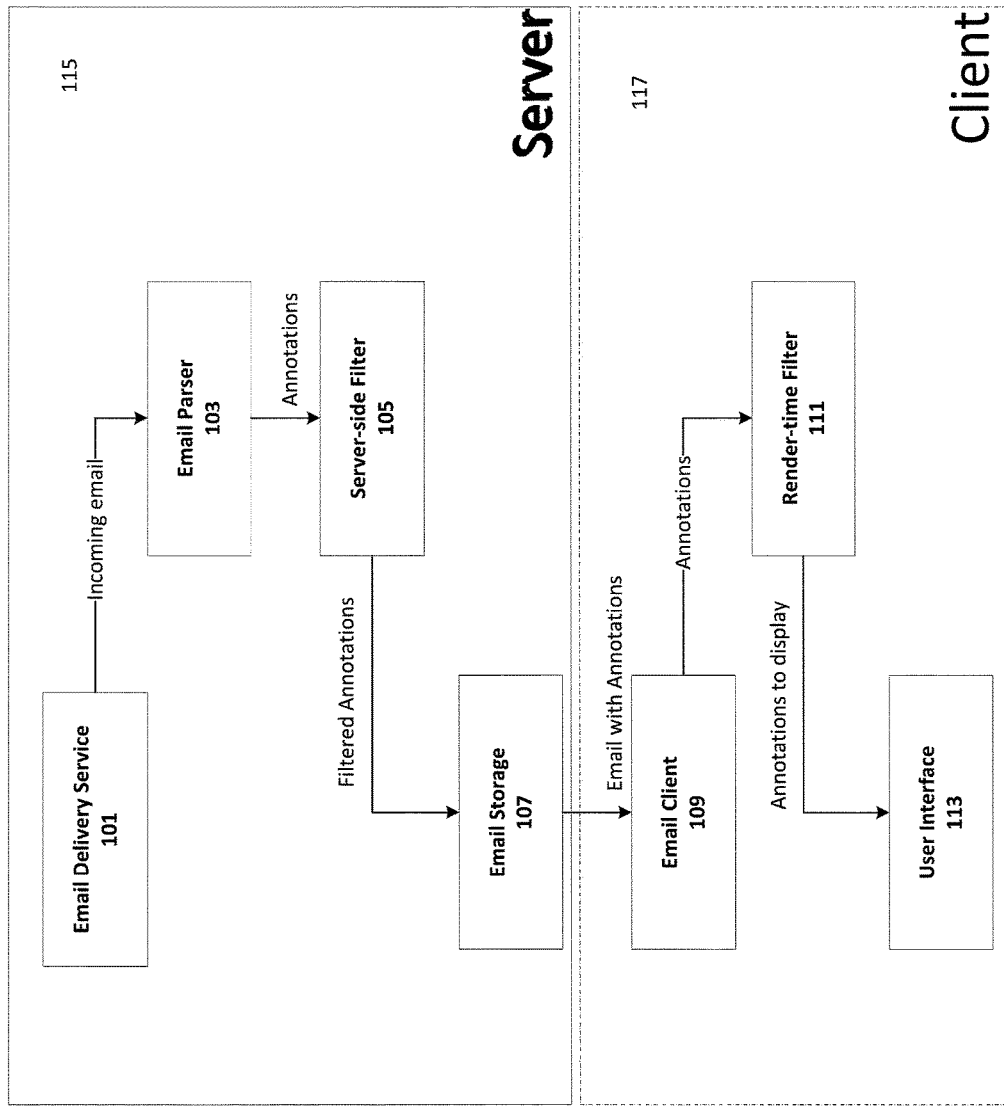
FIG. 1 is a block diagram illustrating an exemplary embodiment for filtering email annotations.

According to an exemplary embodiment, an email system may filter annotations that are associated with received emails. Filtering may be conducted on a server, on a client, or two times, once on the server and once on the client, to help ensure that annotations with a low probability of user action are not shown to the user. FIG. 1 illustrates an exemplary system where filtering is done on both the server (115) and the client (117). Filtering on the server-side is done by the server-side filter (105) and filtering on the client-side may be done by the render-time filter (111). An email delivery service (101) may deliver incoming email to an email parser (103) which parses potentially actionable items from the email. The parsed actionable items are then sent to the server-side filter (105), filtered, and the resulting annotations are stored in storage (107). When a client (109) requests the email, the client receives the email and the associated annotations. The annotations may then be filtered again on the client side by the render-time filter (111) before being displayed to a user via a user interface (113). Client-side filtering may in fact be done several times, once at render-time, but also with some frequency afterwards.

Figure 2:
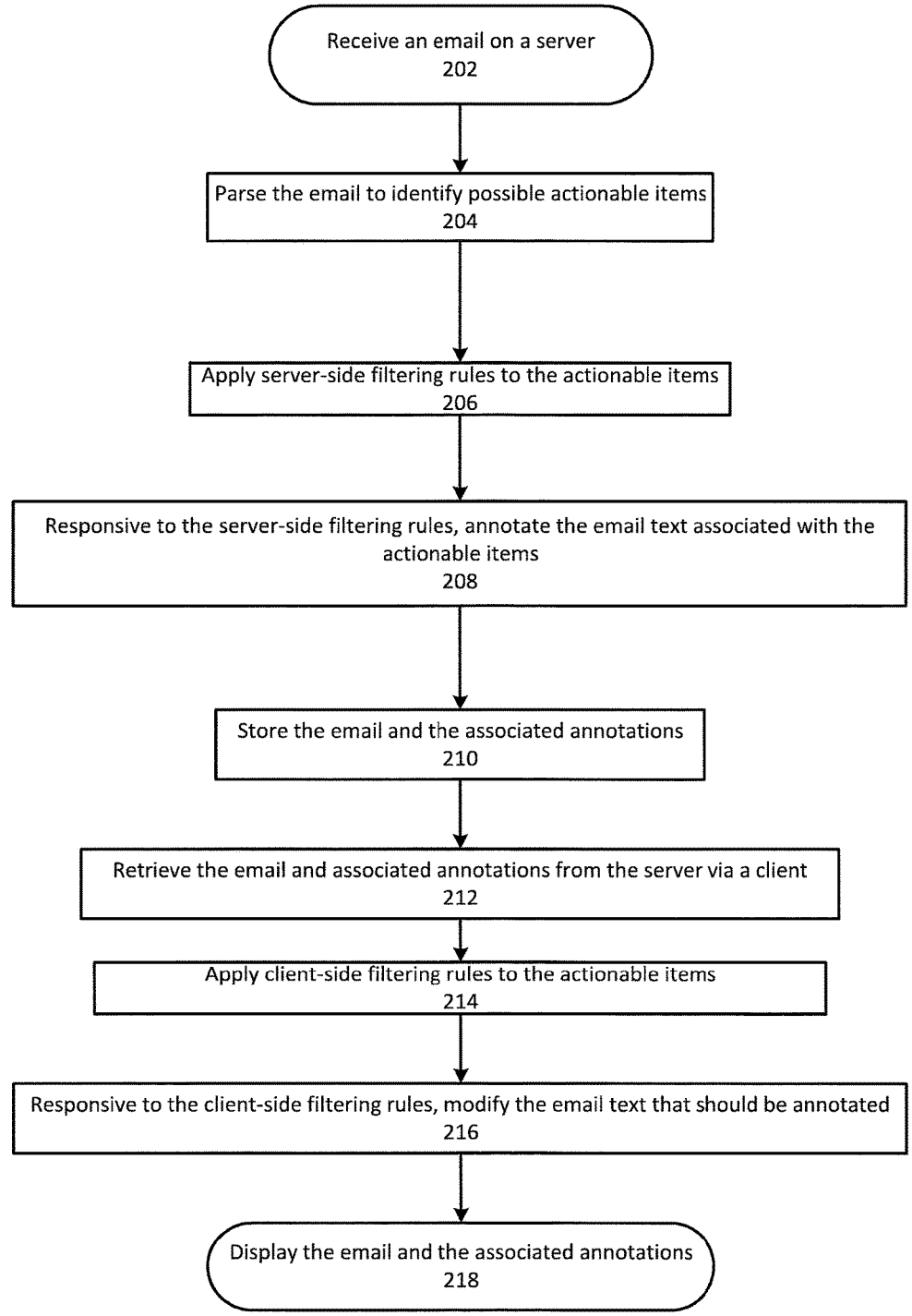
FIG. 2 is a flow diagram of an exemplary method for filtering email annotations.

An exemplary system begins by receiving an email on a server as illustrated in FIG. 2 (202). The email text is parsed to find possible actionable items (204). Email may be parsed using artificial intelligence, machine learning, regular expressions, natural language parsing, context-free grammars, or other parsing rules to find dates and times that may be associated with actionable items. Actionable items are any text which either explicitly or implicitly suggests that a recipient should take some action, for example: urls, dates and/or times, and time-descriptive words such as "tomorrow", "next Thursday", "in five hours from now," or "on the 28th of December." If an email contains the text from the example above, "let's meet tomorrow," a user may want to create an event associated with tomorrow for the meeting. The user may also want to show tomorrow in his or her calendar. Therefore, for the text, "let's meet tomorrow," there may be at least two possible actions associated with the actionable item of meeting tomorrow, one to create an event and one to show the date in the user's calendar. The word "tomorrow" may be annotated to suggest that a user take action.

Although actionable items may be parsed from raw email text and used as annotations as discussed above, annotations may also be created from the output of other annotation systems. An exemplary system may consume the output of other annotation systems and use the output to produce new annotations. For example, an exemplary system which annotates email based on date and time may want to pull out all dates and times. However, the system may not know the format of the dates and times in a particular email since this information can be language-specific. The exemplary system may therefore consume annotations and information about the email's language from a separate annotation system in order to retrieve dates formatted for the email's language. Although the system detecting the language of the e-mail can be separate from the one detecting the dates and times, these two annotation filterings can occur in a single system. The single system should detect an email's language before dates and times so that the dates and times can be detected using on the language.

Server-side filtering rules may then be applied to the actionable items in order to consolidate and maximize the probability that a given annotation associated with an actionable item will be acted upon by a user (206). Filtering rules may include any indicators that may be used to determine the likelihood of a user clicking on annotated text. For example, filtering rules may be used to recognize spam email which a user is not likely to act upon. Several factors may help identify an email as spam including: whether the sender is in the receiver's contact list, the time the email was sent, and the recipient list of the email.

Server-side filtering rules for dates and times may filter dates in the past or multiple instances of the same date or time in a given email. In the above example, the word "tomorrow" would be sent through filtering rules to determine if there is a likelihood that a user would click on the annotation to perform some action. Another filter example is recognizing emails that contain ICS files, which are files in a universal calendar format that is used by several email and calendar programs, and not annotating these emails. Filters may also include rules for not annotating emails from certain senders. Additionally, annotations can be filtered out which are considered not particularly useful. For example, the date "November 2012" may be parsed by an exemplary system as a potential annotation. However, "November 2012" may not be specific enough to define a meaningful event for a user. In general, any rules that improve precision of the annotation logic may be implemented server-side.

Applying these filtering rules may result in annotations merged with other annotations or deleted. Merging may be necessary, for example, when the text of an email contains an event date and an event time that are separate from one another. An email system may parse the date and time as two distinct actionable items. Both the date and the time may then be annotated in the email by the system. However, the date and time annotations may be combined to form one actionable item with one annotation at the specified date and time.

There may be at least two kinds of merging including weak and strong merge. Weak merge does not merge the annotation text. Instead, weak merge merges related items in one direction. For example, if an email includes a date annotation and then a time annotation, the time annotation is merged with the date, but the date is not merged with the time. This merge will result in two annotations. The time annotation will show a popup with time and date fields pre-populated, but clicking on the date annotation may result in showing a popup with the date field pre-populated and time defaulting to all day. Strong merge may merge the text of the annotations into a single annotation.

In the filtering process, in addition to merging annotations, duplicate annotations can be deleted. Duplicate annotations occur when the same actionable item appears more than once in an email. For example, if an email contains the text "let's meet tomorrow" and, later in the same email, the words "looking forward to meeting you tomorrow," both instances of the word "tomorrow" may be parsed by the email parser as possible actionable items. However, since both instances of "tomorrow" will result in the same actions, namely creating a calendar event for tomorrow or viewing tomorrow's schedule in a calendar, only one instance of the word "tomorrow" should be annotated.

Filtering may also include removing annotations for actionable items that are associated with dates and/or times that are in the past at the time filtering occurs since a user has a low probability of taking action on a date that has occurred in the past.

An advantage of filtering actionable items on the server is that the logic for parsing actionable items, merging actionable items, and complex filtering can reside in the back-end of the email system. Therefore, the email client does not have to perform computationally complex analysis on emails, but can perform second-pass filtering at render-time on the actionable items.

After the server-side filtering rules have been applied, the email text may be annotated to denote the actionable items (208). Annotations may include information regarding how to carry out the appropriate actions. Annotations may also include information that may assist in the decision about whether to show the annotations to an end user. For example, as discussed above, the word "tomorrow" may be an actionable item. If the email is received on Nov. 20, 2012, the server may resolve "tomorrow" to be Nov. 21, 2012. The specific date, Nov. 21, 2012 may be stored as part of the annotation for "tomorrow."

Actions may be linked to actionable items in email text and may be shown as hyperlinks, underlining, highlighting, or some other form of text-modification in order to distinguish the actionable items from the rest of the email text. In an exemplary system, each annotation may be linked to a new event popup with prepopulated event details. This link may be a URL or it could be a javascript solution that listens for clicks and shows the popup on click. Multiple actions may be associated with a given email text. The email and its associated annotations may then be stored on the server (210). Annotations and their associated original emails may be stored together or completely separately. Annotations may alternatively be stored in an object such as a proto message that is linked to the object representation of the associated email.

Figure 3:
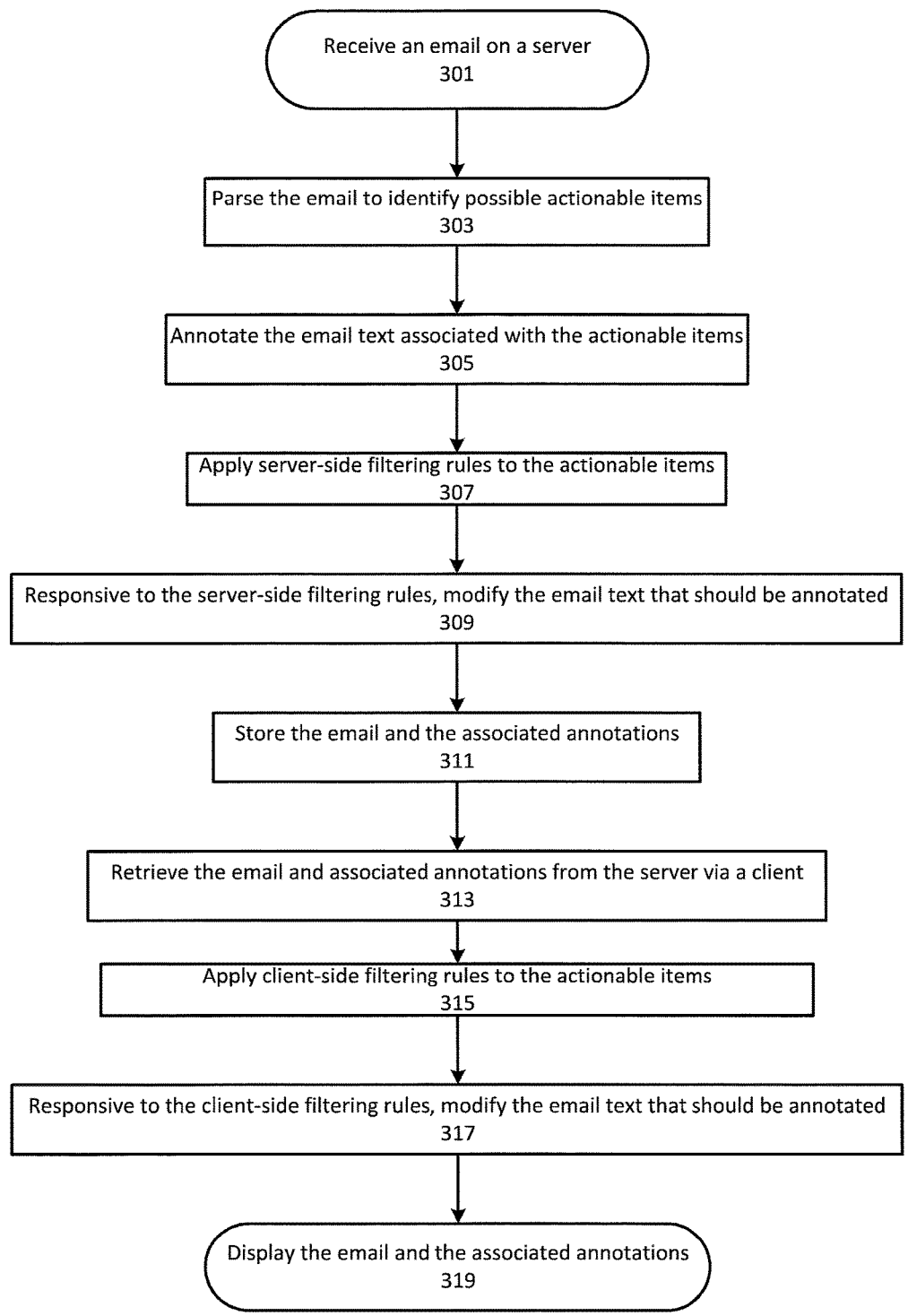
FIG. 3 is a flow diagram of an exemplary method for filtering email annotations.

In some embodiments, as illustrated in FIG. 3, a server annotates email text prior to filtering the actionable items (305). After applying the server-side filters (307), the server then modifies the annotated email text to annotate only the text associated with actionable items that have a high probability for user action (309).

In an exemplary system, an email client may retrieve a person's email from the server (212). When the client fetches an email from the server, the client may also obtain any of the annotations associated with the email that has been filtered by the server (212). The email client may then apply real-time annotation filters to the actionable items associated with the annotation in order to determine which server-side annotations to display to the user (214). These real-time, or render-time, filters may filter out dates and times that are in the past. Filters may additionally consist of any rules that depend on an email message's state, which can be changed by user action. For example, if a user has marked an email message as spam, filter rules may be applied to not display annotations. If the email is then marked as non-spam, filter rules should ensure that annotations are rendered. After filters are applied, some email text that was previously annotated may no longer be annotated. In other words, the email text that is annotated may be changed (216). Once the annotations have been determined based on the client-side filters, the email and its associated annotations are displayed to the user (218).

Figure 4:
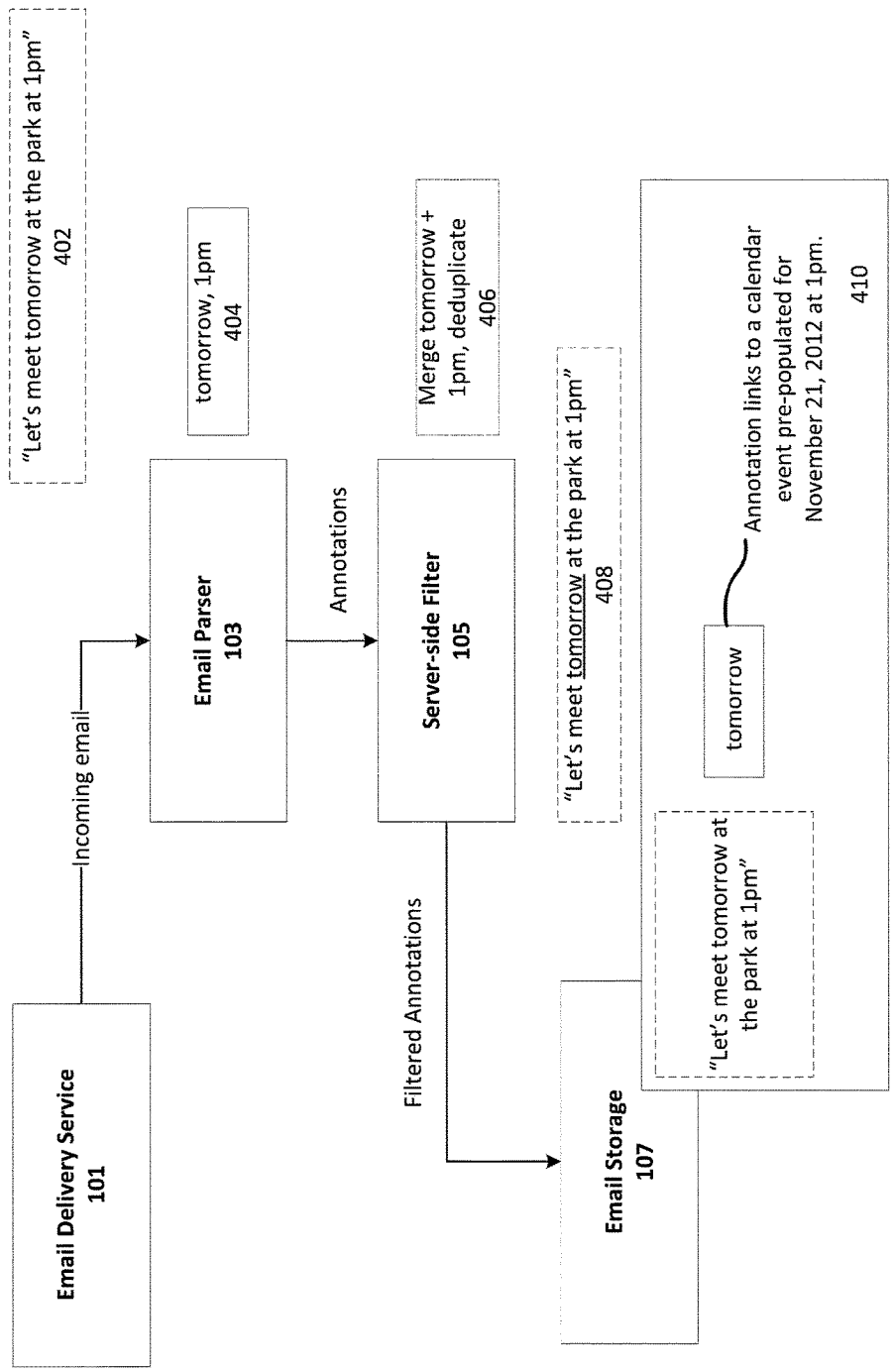
FIG. 4 is a block diagram illustrating an exemplary embodiment for filtering email annotations on a server.
Figure 5:
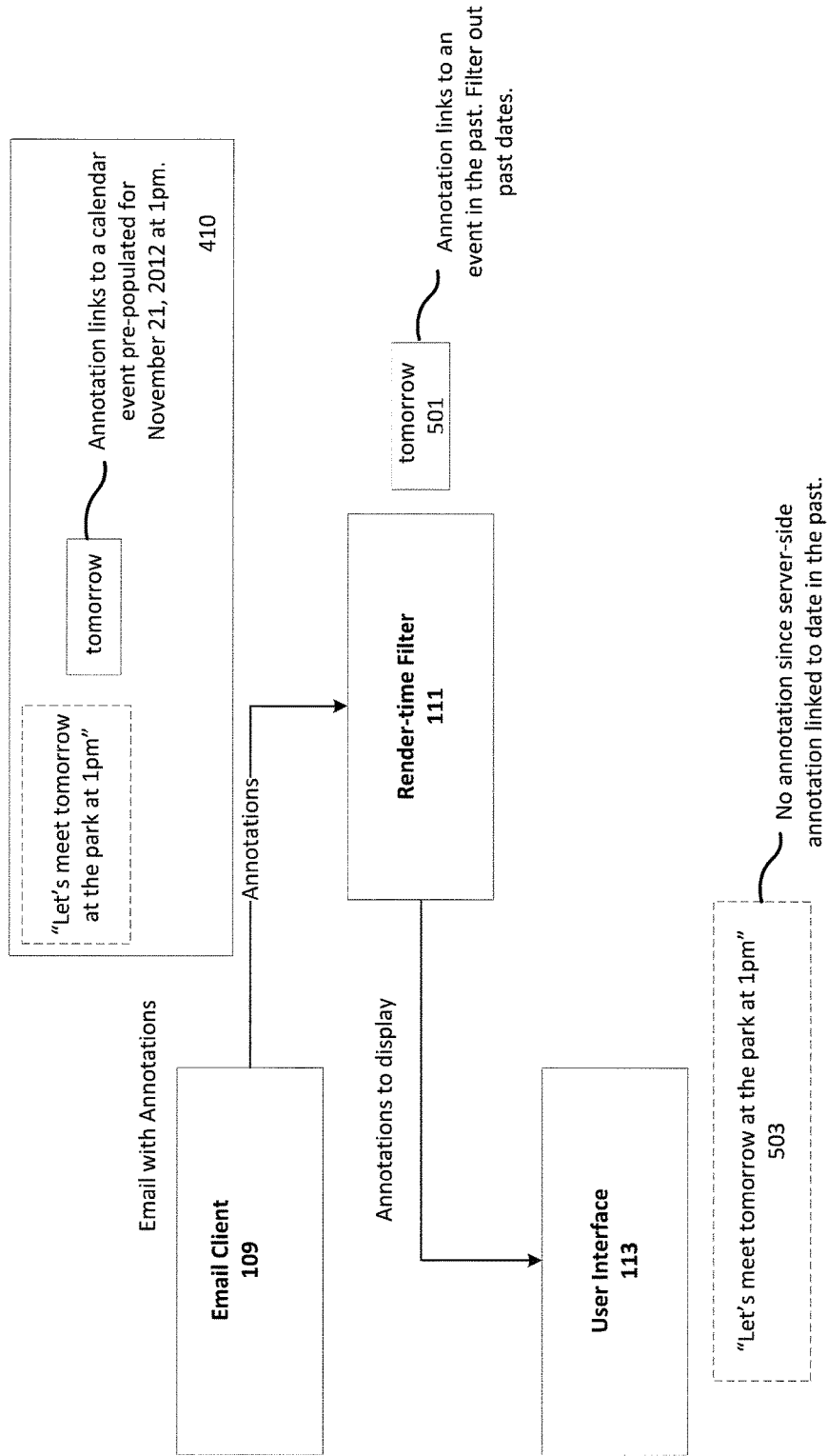
FIG. 5 is a block diagram illustrating an exemplary embodiment for filtering email annotations on a client.

For example, as depicted in FIGS. 4 and 5, server-side annotations may include a date and/or time that was in the future when the email was received by the server, but is in the past when the client retrieves the email to display to a person.

As illustrated in FIG. 4, a server may receive an email that has the text, "let's meet tomorrow at the park at 1 pm." on Nov. 20, 2012 (402). An email parser may parse the email for relevant actionable items and may find the word, "tomorrow," and the time "1 pm." (404). These terms may be considered actionable items. However, they may be merged together to form one actionable item to create a calendar event for 1 pm on Nov. 21, 2012. If annotations have been created for both "tomorrow" and "1 pm," an exemplary system may merge the actionable items and delete the duplicate action using strong merge or may keep both annotations, but prepopulate time and date fields in the popup associated with the time annotation and only the date field in the popup associated with the date annotation using weak merge (406). If the email text has not yet been annotated, an exemplary system may annotate only the word "tomorrow" for example (408). If the email text had previously been annotated on both the words "tomorrow" and "1 pm," one of the annotations would be removed. The email and the annotation (410) may then be stored on the server (107). Javascript code which displays a popup when a user clicks on annotated text may be generated when the annotation is displayed by the client.

Alternatively, annotated text may be linked to event detail pages in calendar systems using URLs. In other embodiments, an iCS file with event details may be uploaded into the calendaring service of choice.

An email client (109) may then retrieve the email from the server on Nov. 22, 2012 as illustrated in FIG. 5 (410). The client (109) may additionally retrieve the email's associated annotation (410). A real-time client-side filter (111) may apply filter rules to the actionable items. In FIG. 5, the filter rules are applied to the date Nov. 21, 2012 (501). This actionable item should be filtered out and deleted since Nov. 21, 2012 is a date in the past when the email is retrieved on Nov. 22, 2012. It is highly unlikely that a user will create a calendar event for this past event or want to view this date in his or her calendar. Therefore, the date Nov. 21, 2012 should not be annotated. The user interface (113) will display the email with no annotations (503) since the only possible annotation was filtered out by the client-side real-time filter (111).

Figure 6:
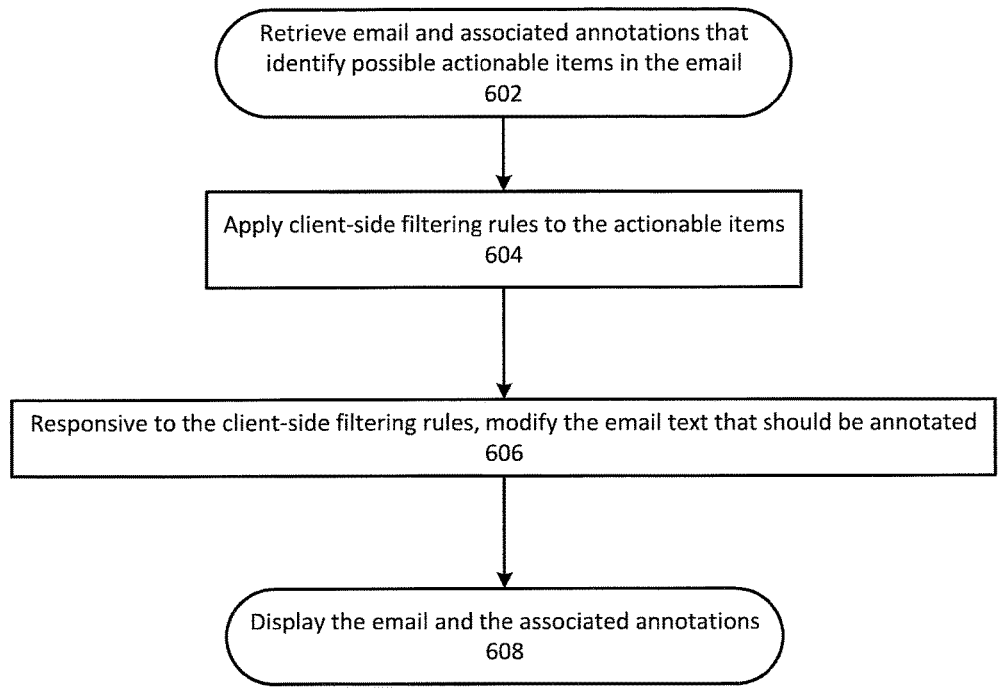
FIG. 6 is a flow diagram of an exemplary method for filtering email annotations on a client.

In an exemplary embodiment, as illustrated in FIG. 6, an exemplary system may not have control over email or email annotations coming from a server. Annotations may be retrieved from the server without any server-side filtering having been performed on them. Therefore, the client must perform all of the filtering. The email client may apply real-time annotation filters similar to server-side filters to annotations representing actionable items. Filtering may include merging, deleting, removing duplicates, and eliminating actionable items and annotations for events in the past.

Figure 7:
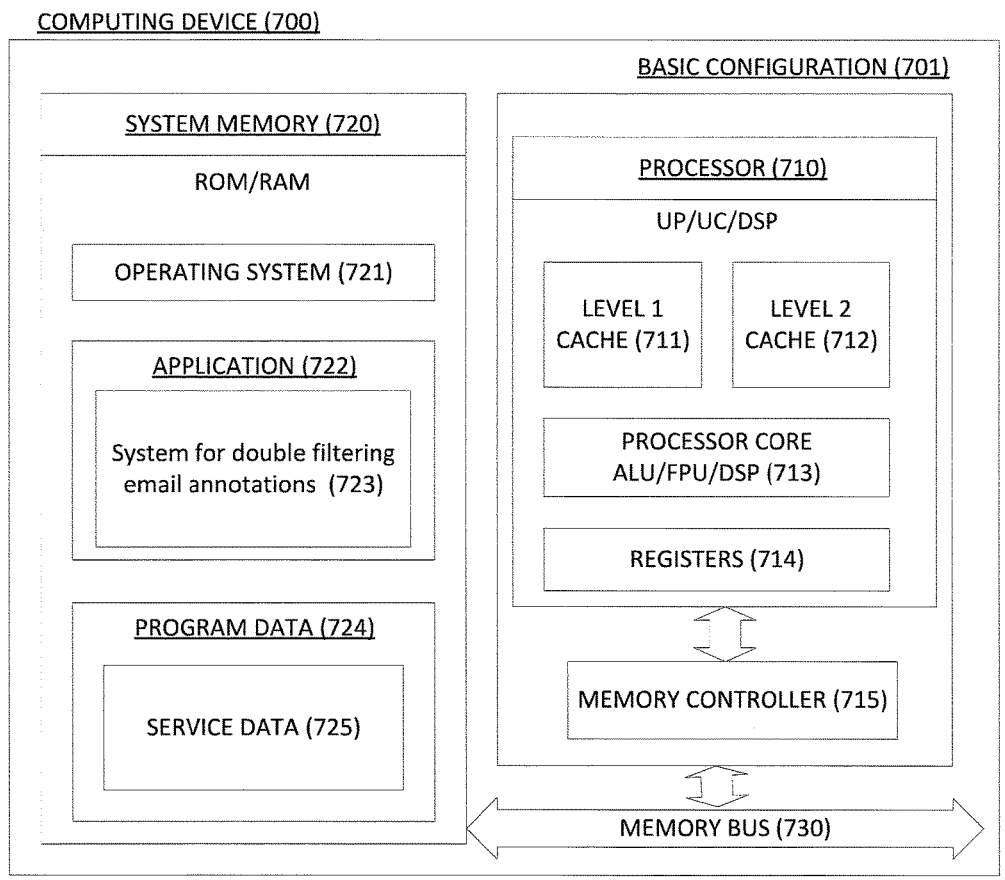
FIG. 7 is a block diagram illustrating an exemplary computing device.

FIG. 7 is a high-level block diagram of an exemplary computer (700) that is arranged for parsing actionable items from email and annotating the email text associated with the actionable items that have a high probability of user action. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (716) can also be used with the processor (710), or in some implementations the memory controller (715) can be an internal part of the processor (710).

Depending on the desired configuration, the system memory (720) can be of any type including but not limited to volatile memory (such as RAM), non-volatile memory (such as ROM, flash memory, etc.) or any combination thereof. System memory (720) typically includes an operating system (721), one or more applications (722), and program data (724). The application (722) may include a system for double filtering email annotations so that only annotations associated with actions that a user is likely to take are shown to a user. Program Data (724) includes storing instructions that, when executed by the one or more processing devices, implement a system and method for parsing actionable items from email text and filtering these actionable items to only display those that a user is likely to act upon. (723). In some embodiments, the application (722) can be arranged to operate with program data (724) on an operating system (721).

The computing device (700) can have additional features or functionality, and additional interfaces to facilitate communications between the basic configuration (701) and any required devices and interfaces.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (700) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
  retrieving, by a client and from a server, email containing annotated text and other text, wherein the annotated text contained in the e-mail is associated with actionable item annotations that identify the annotated text as indicating possible actionable items for a user in the email and allow the user to take an action;
  applying client-side filtering rules to the actionable item annotations to generate one or more remaining annotations, wherein applying client-side filtering rules to the actionable item annotations includes:
    filtering out first annotations from the actionable item annotations, the first annotations having a low probability of user action relative to probabilities of user actions with the actionable item annotations other than the first annotations; and
    merging one or more groups of related annotations from the actionable item annotations into a respective annotation from the actionable item annotations that represents a single group of the one or more groups of related annotations from the actionable item annotations;
  responsive to applying the client-side filtering rules to the actionable item annotations, determining at least one of the one or more remaining annotations that should be displayed to the user; and
  displaying the email and the at least one of the one or more remaining annotations.

2. The method of claim 1, wherein displaying the email and the at least one of the one or more remaining annotations comprises displaying the email by visually distinguishing portions of the annotated text of the email that are associated with actionable items identified by the at least one of the one or more remaining annotations from other text of the email.

3. The method of claim 1, wherein applying client-side filtering rules to the actionable item annotations comprises:
  extracting a particular date from a particular annotation from the actionable item annotations;
  determining whether the particular date occurs prior to a current date; and
  responsive to determining that the particular date occurs prior to the current date, determining that the particular annotation is one of the first annotations.

4. The method of claim 1 wherein applying client-side filtering rules to the actionable item annotations comprises:
  determining whether a particular annotation from the actionable item annotations is associated with spam email; and
  responsive determining that particular annotation from the actionable item annotations is associated with spam email, determining that the particular annotation is one of the first annotations.

5. A system comprising:
  one or more processors; and one or more storage devices storing instructions that, when executed, cause the one or more processors to:

retrieve, from a server, email containing annotated text and other text, wherein the annotated text contained in the e-mail is associated with actionable item annotations that identify the annotated text as indicating possible actionable items for a user in the email and allow the user to take an action;

apply client-side filtering rules to the annotations to generate one or more remaining annotations by:
  filtering out first annotations from the actionable item annotations, the first annotations having a low probability of user action relative to probabilities of user actions with the actionable item annotations other than the first annotations; and
  merging one or more groups of related annotations from the actionable item annotations into a respective annotation from the actionable item annotations that represents a single group of the one or more groups of related annotations from the actionable item annotations;

responsive to applying the client-side filtering rules to the actionable item annotations, determine at least one of the one or more remaining annotations that should be displayed to the user; and display the email and the at least one of the one or more remaining annotations.

6. The system of claim 5 wherein the instructions, when executed, further cause the one or more processors to display the email and the at least one of the one or more remaining annotations comprises displaying the email by visually distinguishing portions of the annotated text of the email that are associated with actionable items identified by the at least one of the one or more remaining annotations from other text of the email.

7. The system of claim 5 wherein the instructions, when executed, further cause the one or more processors to apply client-side filtering rules to the actionable item annotations by:
  extracting a particular date from a particular annotation from the actionable item annotations;
  determining whether the particular date occurs prior to a current date; and
  responsive to determining that the particular date occurs prior to the current date, determining that the particular annotation is one of the first annotations.

8. The system of claim 5 wherein the instructions, when executed, further cause the one or more processors to apply client-side filtering rules to the actionable item annotations by:
  determining whether a particular annotation from the actionable item annotations is associated with spam email; and
  responsive determining that the particular annotation from the actionable item annotations is associated with spam email, determining that the particular annotation is one of the first annotations.

9. A non-transitory computer-readable storage medium comprising instructions that, when executed, cause one or more processors of a client device to:

retrieve, from a server, email containing annotated text and other text, wherein the annotated text contained in the e-mail is associated with actionable item annotations that identify the annotated text as indicating possible actionable items for a user in the email and allow the user to take an action;

apply client-side filtering rules to the annotations to generate one or more remaining annotations by:
  filtering out first annotations from the actionable item annotations, the first annotations having a low probability of user action relative to probabilities of user actions with the actionable item annotations other than the first annotations; and
  merging one or more groups of related annotations from the actionable item annotations into a respective annotation from the actionable item annotations that represents a single group of the one or more groups of related annotations from the actionable item annotations;

responsive to applying the client-side filtering rules to the actionable item annotations, determine at least one of the one or more remaining annotations that should be displayed to the user; and display the email and the at least one of the one or more remaining annotations.

10. The non-transitory computer-readable storage medium of claim 9, wherein the instructions, when executed, further cause the one or more processors to display the email and the at least one of the one or more remaining annotations by displaying the email by visually distinguishing portions of the annotated text of the email that are associated with actionable items identified by the at least one of the one or more remaining annotations.

11. The non-transitory computer-readable storage medium of claim 9, wherein the instructions, when executed, further cause the one or more processors to apply client-side filtering rules to the actionable item annotations by:
  extracting a particular date from a particular annotation from the actionable item annotations;
  determining whether the particular date occurs prior to a current date; and
  responsive to determining that the particular date occurs prior to the current date, determining that the particular annotation is one of the first annotations.

12. The non-transitory computer-readable storage medium of claim 9, wherein the instructions, when executed, further cause the one or more processors to apply client-side filtering rules to the actionable item annotations by:
  determining whether a particular annotation from the actionable item annotations is associated with spam email; and
  responsive determining that particular annotation from the actionable item annotations is associated with spam email, determining that the particular annotation is one of the first annotations.

* * * * *